(12) United States Patent
Bennett, III et al.

(10) Patent No.: US 8,341,276 B1
(45) Date of Patent: *Dec. 25, 2012

(54) NEGOTIATING INTERNET PROTOCOL ADDRESSES IN A NETWORK

(75) Inventors: John H. Bennett, III, Lawrence, KS (US); Frederick C. Rogers, Olathe, KS (US); C. Brent Hirschman, Overland Park, KS (US); Serge M. Manning, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/842,707

(22) Filed: Jul. 23, 2010

(51) Int. Cl.
*G06F 15/16* (2006.01)

(52) U.S. Cl. ........................................ 709/228; 709/222

(58) Field of Classification Search .................. 709/222, 709/227, 228
See application file for complete search history.

(56) References Cited

U.S. PATENT DOCUMENTS

| 7,075,932 B2 * | 7/2006 | Matsuhira et al. ........ 370/395.31 |
| 2006/0092964 A1 * | 5/2006 | Park et al. ..................... 370/437 |

* cited by examiner

*Primary Examiner* — Joseph Avellino
*Assistant Examiner* — Marshall McLeod

(57) ABSTRACT

Methods are provided for negotiating a static IPv6 address with a mobile device such that the mobile device can use the address to establish a communications session. Initially, a static IPv6 address that the mobile device is proposing to use is received. It is determined that the static IPv6 address is stored in a database in association with the mobile device. As the static IPv6 address is stored, the mobile device is allowed to establish a communications session using the proposed IPv6 address.

20 Claims, 6 Drawing Sheets

NEGOTIATING INTERNET PROTOCOL ADDRESSES IN A NETWORK

CROSS REFERENCE TO RELATED APPLICATIONS

This application is related by subject matter to commonly assigned U.S. patent application entitled "ASSIGNING INTERNET PROTOCOL ADDRESSES IN A NETWORK" application Ser. No. 12/842,665, filed concurrently herewith on the same date and is hereby incorporated by reference in its entirety.

SUMMARY

A high-level overview of various aspects of our technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for negotiating a static Internet Protocol version six (IPv6) address with a mobile device in a communications network. A mobile device sends a proposed static IPv6 address to the network so that the network can verify that the address is associated with the user and stored in a database, and that the address is not already being used by another device.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
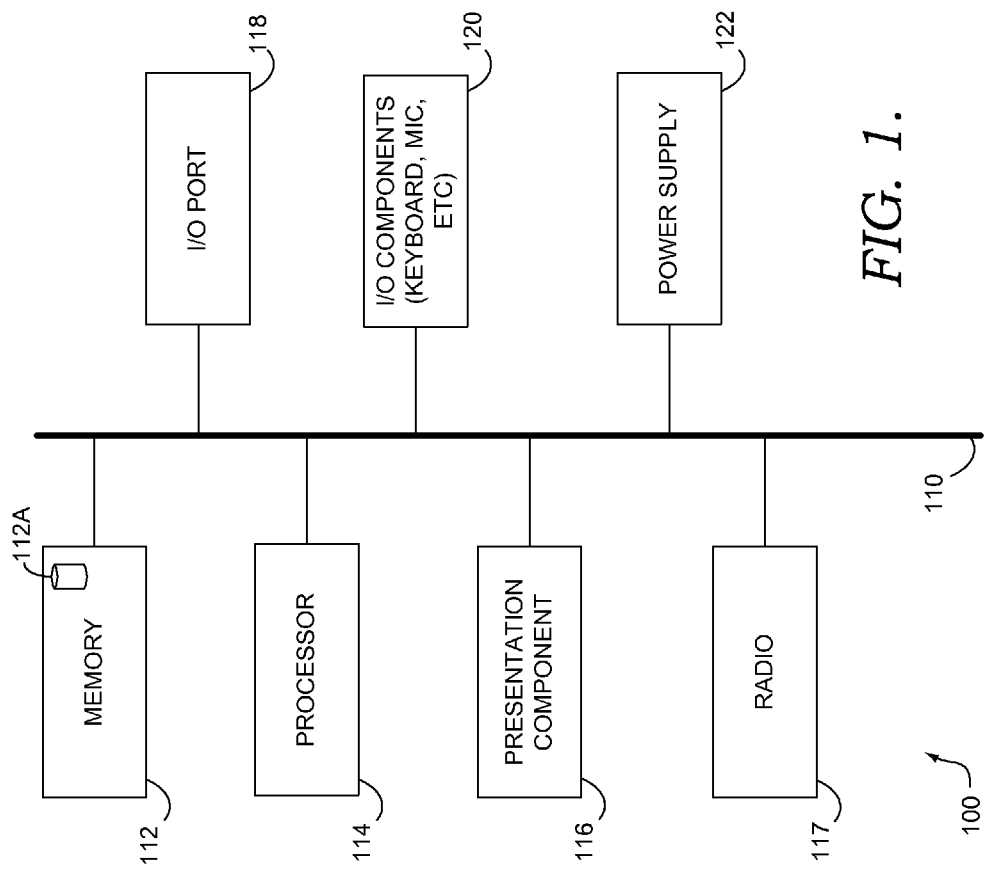
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| BTS | Base Transceiver Station |
| CDMA | Code Division Multiple Access |
| DAD | Duplicate Address Detection |
| DNS | Domain Name System |
| FA | Foreign Agent |
| GGSN | GPRS Gateway Support Node |
| GPRS | General Packet Radio Service |
| GSM | Global System for Mobile communications (Groupe Spécial Mobile) |
| HA | Home Agent |
| HTTP | Hypertext Transfer Protocol |
| IP | Internet Protocol |
| IPv6 | Internet Protocol Version Six |
| LED | Light Emitting Diode |
| LMA | Local Mobility Anchor |
| MAG | Mobility Access Gateway |
| NAI | Network Access Identifier |
| PDA | Personal Data Assistant |
| PDSN | Packet Data Serving Node |
| PPP | Point-to-Point Protocol |
| RNC | Radio Network Controller |
| SS7 | Signaling System Seven |
| TDMA | Time Division Multiple Access |
| UMTS | Universal Mobile Telecommunications System |
| VOIP | Voice over Internet Protocol |

Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media includes both volatile and nonvolatile media, removable and nonremovable media, and contemplates media readable by a database, a switch, and various other network and computing devices. Computer-readable media includes media implemented in any method or technology that stores information. Examples of stored information include computer-useable instructions, data structures, program modules, and other data representations. Examples of computer-readable media include, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

As mentioned, embodiments of the present invention include methods, systems, and computer-readable media for negotiating a static IPv6 address with a mobile device in a communications network. A mobile device provides at least a portion of a suggested static IPv6 address such as a host portion, and a customer-profile database is inspected to determine whether that static IPv6 address is stored in association with the mobile device. If the static IPv6 address is stored in the customer-profile database in association with the mobile device, the mobile device is notified that is can use that static IPv6 address. If the static IPv6 address suggested by the mobile device is not stored in the customer-profile database, a duplication check is performed to determine if that static IPv6 address or a portion thereof (e.g., host portion) is currently being used by another device in the network. If so, the mobile device may suggest a different static IPv6 address, or a static IPv6 address, such as the host portion, may be randomly assigned by a network component. If not, the mobile device is allowed to use that static IPv6 address.

In one aspect of the present invention, computer-readable media having computer-executable instructions embodied thereon that, when executed, facilitate a method for negotiating Internet Protocol version six (IPv6) addresses with mobile devices are provided. The method includes receiving a static IPv6 address from a mobile device indicating that the mobile device is requesting to use the static IPv6 address for an IPv6 communications session and determining that the static IPv6 address received from the mobile device is stored in a customer-profile database in association with the mobile device. Further, the method includes allowing the mobile device to establish the IPv6 communications session using the static IPv6 address received from the mobile device.

In a further aspect of the present invention, computer-readable media having computer-executable instructions embodied thereon that, when executed, facilitate a method for negotiating Internet Protocol version six (IPv6) addresses with mobile devices are provided. The method includes receiving a request from a mobile device to establish an IPv6 communications session. The request comprises at least a portion of a static IPv6 address. Further, the method includes accessing a customer-profile database to determine that the static IPv6 address received from the mobile device is not stored in the customer-profile database in association with the mobile device and determining whether the static IPv6 address received from the mobile device is currently available. If the static IPv6 address is currently unavailable, an indication is communicated to the mobile device that the static IPv6 address is unavailable. But, if the static IPv6 address is currently available, an acknowledgment is communicated to the mobile device indicating that the static IPv6 address is available. Also, the static IPv6 address is stored in the customer-profile database in association with the mobile device.

In another aspect of the present invention, computer-readable media having computer-executable instructions embodied thereon that, when executed, facilitate a method for negotiating Internet Protocol version six (IPv6) addresses with mobile devices are provided. The method includes receiving a request from a mobile device to establish an IPv6 communications session. The request includes a host portion and a network portion of a static IPv6 address that the mobile device is proposing to use for the IPv6 communications session. Further, the method includes determining that the static IPv6 address is not stored in a customer-profile database in association with the mobile device, inspecting other static IPv6 addresses currently being used to determine that the static IPv6 address is available, and communicating a confirmation to the mobile device that the static IPv6 address is available. Additionally, the method includes initiating an update request to update a subscriber profile associated with the mobile device in the customer-profile database to indicate that the static IPv6 address is associated with the mobile device.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, WIMAX, LTE, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
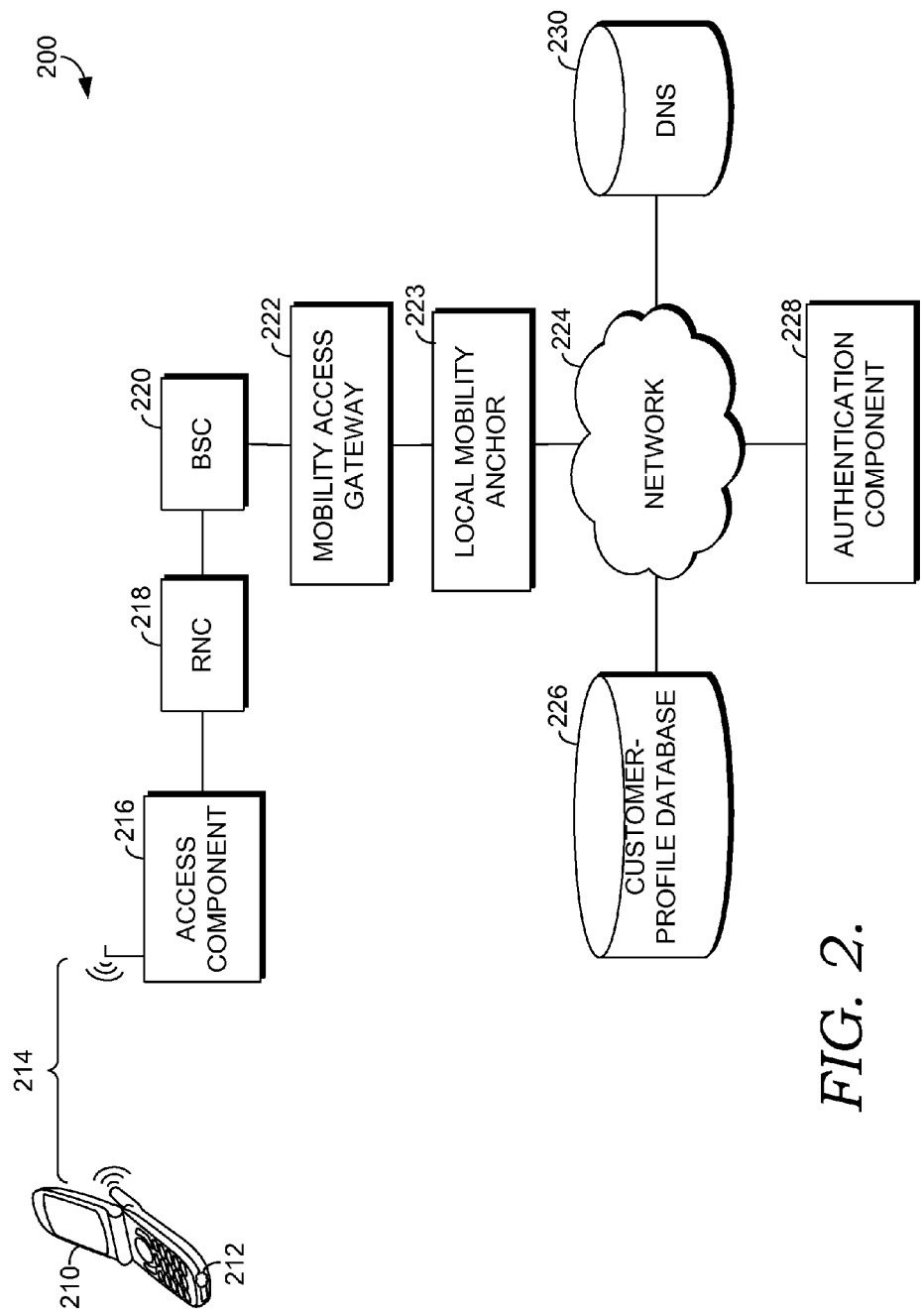
FIG. 2 depicts an illustrative operating system suitable for practicing an embodiment of the present invention.

Turning now to FIG. 2, an illustrative operating environment is provided and referenced generally by the numeral 200, which depicts an illustrative networking environment that enables an assignment and a negotiation of an IPv6 address. Mobile device 210 is the type of device described in connection with FIG. 1 in one embodiment. It includes a client application 212 that helps carry out aspects of the technology described herein. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application 212 determines a proposed static IPv6 address that it would like to use to establish an IPv6 communications session and communicates this address to the network for verification. In alternate embodiments, the client application 212 receives messages, such as acknowledgments from various network components indicating that the static IPv6 address has been verified, for instance.

Mobile device 210 communicates with an access component 216 by way of a communications link 214. Communications link 214 may be a short-range connection, a long-range connection, or a combination of both a short-range and a long-range wireless telecommunications connection. When we refer to "short" and "long" types of connections, we do not mean to refer to the spatial relation between two devices.

Instead, we are generally referring to short range and long range as different categories, or types, of connections (i.e., a primary connection and a secondary connection). A short-range connection may include a WiFi connection to a device (e.g., mobile hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network, also termed a core network. A wireless communications network may comprise one or more of the components illustrated in FIG. 2. To the contrary, not all components that make up a wireless communications network are shown. Also, not all connections or possible connections are shown. The access component 216 may be one or more of a base transceiver station (BTS) tower, a WiFi Router, a Mobile Hotspot, and any other device that facilitates communication between mobile device 210 and network 224. In one embodiment, the access component 216 includes both a WiFi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC acts as the intelligence behind base transceiver stations (BTS) (not shown), and handles allocation of radio channels, receives measurements from mobile devices, and controls handovers from one BTS to another BTS.

The components illustrated in FIG. 2, such as those that may be included in a wireless communications network include a mobility access gateway (MAG) 222, a local mobility anchor 223 (LMA), a customer-profile database 226, an authentication component 228, and a domain name server (DNS) 230. As mentioned, other components not shown here may also be used to carry out aspects of the present invention. Further, several components shown in FIG. 2 may be combined into a single component although shown separately in FIG. 2. A MAG 222 may be known to those of ordinary skill in the art as a packet data serving node (PDSN), typically used in CDMA networks, a foreign agent (FA), or a GPRS gateway support node (GGSN), typically used in GSM and UMTS networks. The MAG 222 acts as the serving point between the radio access and IP networks. It is responsible for managing point-to-point protocol (PPP) sessions between the mobile provider's core IP network 224 and the mobile device 210. At a high level, the MAG 222 helps provide access to the Internet as well as to other network technologies and application services. It helps provide mobile IP (MIP) access, one-agent support, and transportation of packets to facilitate the funneling or communicating of data through virtual private networks. It can act as a client for an authentication server, such as authentication component 228, which helps ensure that mobile device 210 is authorized to communicate via the wireless communications network. In one embodiment, the MAG 222 includes a set of computer executable instructions that helps carry out various aspects of technology described herein. The LMA 223 may assign a portion of an IPv6 address, such as a network portion, to mobile device 210. The LMA is also known by some skilled artisans as a Home Agent (HA).

The customer-profile database 226, the authentication component 228, and the DNS server 230 are shown as being outside the boundary of the network 224, but in embodiments of the present invention one or more of these components are actually located within the network 224. The customer-profile database 226 is used to store various attributes associated with mobile devices, such as an identification of the mobile device (e.g., network access identifier (NAI)), an identification of the subscriber of the mobile device, a network portion and/or a host portion of an IP address associated with the mobile device, usage information, a subscriber's plan information (e.g., voice services, data services, call forwarding), etc. Generally, an IP address is a numerical label that is assigned to devices in a network that use the Internet Protocol for communication between its attached devices. An IP address serves two functions, including to identify the host and network interface and location addressing. A static IPv6 address is assigned to a mobile device and is meant to be that device's permanent address such that it would use the same IPv6 address each time it attaches to the network. As used herein, the network portion of a static IPv6 address, also termed the prefix portion, is the first 64-bits of the IPv6 address. The host portion of the static IPv6 address, also termed the interface portion, is the last 64-bits of the IPv6 address.

In embodiments of the present invention, the customer-profile database 226 is accessed to determine whether at least a portion of a static IPv6 address is stored in association with a particular mobile device. For instance, a mobile device may request that a communications session be established, such that an IPv6 address is required. Various network components may be involved in accessing the customer-profile database 226 to determine whether a static IPv6 address is defined for that particular mobile device. Or, in alternative embodiments, the mobile device may provide a proposed static IPv6 address to the network, such as either an address that the mobile device has used before or an address that the mobile device has not used before. In either case, the customer-profile database 226 is accessed to determine whether the proposed IPv6 address is defined or stored for that particular mobile device. While shown as a single component, the customer-profile database 226 may actually be more than one database or other storage device.

The authentication component 228, in one embodiment, is an authentication, authorization, and accounting (AAA) server. An AAA server is generally responsible for authorizing a mobile device to perform a given activity, such as logging onto an application or service, authenticating a mobile device on the network, and providing accounting services, such as tracking the consumption of network resources by mobile devices. Here, the authentication component 228 is responsible for accessing the customer-profile database 226 to determine whether, for example, a static IPv6 address is defined for a particular mobile device. The DNS 230 is a domain-name system server that manages the names of websites and other Internet domains.

Generally, in this disclosure, when we speak of communicating data or information we are referring to any action that requires mobile device 210 to have an IP address in order to carry out some action. Mobile device 210 might attempt to access items such as the Internet as well as other components that might alone or in combination facilitate things such as television reception, e-mail reception, picture mail, video mail, video conferencing, and the like.

Figure 3:
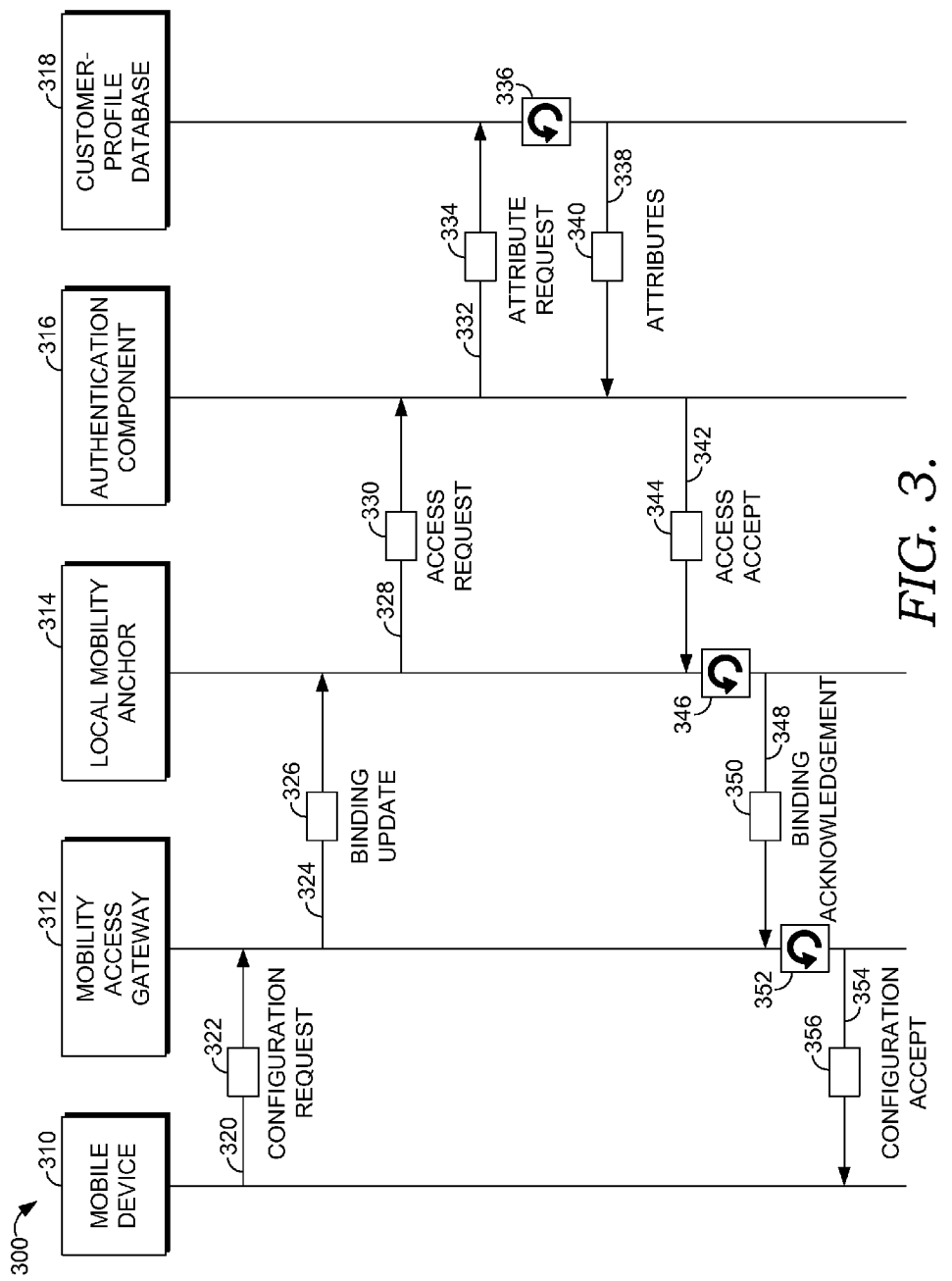
FIG. 3 depicts a flow diagram illustrating a method for assigning a static Internet Protocol (IP) version six (IPV6) address to a mobile device, in accordance with an embodiment of the present invention.

Turning now to FIG. 3, a flow diagram is depicted that illustrates a method 300 for assigning a static IPv6 address to a mobile device, in accordance with an embodiment of the present invention. Various components are shown in the embodiment of FIG. 3, including a mobile device 310, a MAG 312, an LMA 314, an authentication component 316, and a customer-profile database 318. Initially, the mobile device 310 communicates 320 a configuration request 322 to the MAG 312. Here, the mobile device 310 and the MAG 312 configure a link-local address. The configuration request 322, in one embodiment, uses IPv6 control protocol (IPv6CP) for establishing and configuring IPv6 communications sessions over PPP links. IPv6CP is responsible for configuring, enabling, and disabling the IPv6 protocol modules on both ends of the point-to-point link. Packets are exchanged using IPv6CP when PPP has reached the network-layer protocol phase. In one instance, the configuration request 322 includes an indication that the mobile device 310 does not have at least a portion of a static IPv6 address required to establish an IPv6 communications session. For example, the mobile device 310 may already know the first portion, or a network portion of the IPv6 address, but may need the second portion, or the host portion of the IPv6 address.

The MAG 312 communicates 324 a binding update 326 to the LMA 314, which may include various information corresponding to the mobile device 310 or the user associated with the mobile device 310. This information may include a network access identifier (NAI), the address or other identifying information of the MAG 312, and an indication as to whether or not the MAG 312 knows any portion of the static IPv6 address associated with the mobile device. For instance, the MAG 312 may know the network portion of the IPv6 address but not the host portion. In this case, the binding update 326 would indicate that only the host portion is needed. Further, the binding update 326 may also identify a protocol used to communicate the binding update 326. In one embodiment, the protocol is proxy mobile IPv6 (PMIPv6), which is a network-based mobility management protocol. PMIPv6 allows functionality to be implemented on the network side, as opposed to the client's side (e.g., client mobile IPv6). LMA and MAG are common network identities that are involved in mobility management using PMIPv6. Once the binding update 326 is received at the LMA 314, the LMA 314 communicates 328 an access request 330 to the authentication component 316. The access request 330 requests various attributes associated with the mobile device 310, including, for exemplary purposes only, the network portion of the IPv6 address, the host portion of the IPv6 address, and the DNS to which the mobile device is assigned. In one instance, one or more of the network portion or the host portion of the IPv6 address may already be known, and in that case, that portion of the IPv6 address would not be requested.

The authentication component 316 communicates 332 an attribute request 334 to the customer-profile database 318 to identify those attributes included in the access request 330. At step 336, the customer-profile database performs a lookup to determine whether it has stored or defined those attributes included in the attribute request 334. The customer-profile database 318 communicates 338 the requested attributes 340 to the authentication component 316. As mentioned, the attributes 340 may include the network portion of the IPv6 address, DNS assignments, and the host portion of the IPv6 address. In one embodiment, the customer-profile database 318 may return the host portion of the IPv6 address to the authentication component 316. But in another embodiment, the host portion may not be returned, as its value may not be stored in the customer-profile database 318. In this case, the host portion may be randomly generated or otherwise assigned to the mobile device by one of the network components, such as the MAG 312. The authentication component 316 communicates 342 an access accept 344 to the LMA 314. The access accept 344 includes the attributes retrieved from the customer-profile database 318. The access accept 344 is a direct response to the access request 330 communicated from the LMA 314.

In some instances, the network portion of the IPv6 address may not be known by the mobile device 310 and may not be defined in the customer-profile database 318. In these instances, the network portion may be randomly generated or otherwise assigned to the mobile device 310 by the LMA 314 at step 346. The LMA 314 communicates 348 a binding acknowledgment 350 to the MAG 312. The binding acknowledgment 350 is a direct response to the binding update 326 communicated by the MAG 312 to the LMA 314. The binding acknowledgment 350 includes any attributes retrieved from the customer-profile database 318. At step 352, if the host portion of the static IPv6 address is not stored in the customer-profile database 318 for the particular mobile device 310, the host portion may be randomly generated or otherwise assigned to the mobile device 310 by the MAG 312. The MAG 312 then communicates 354 a configuration accept 356 to the mobile device 310. The configuration accept 356 is a response to the configuration request 322 communicated by the mobile device 310, and includes one or more of the network portion or host portion of the static IPv6 address assigned to the mobile device 310. For example, if the mobile device 310 already knew the network portion, the host portion would be returned to the mobile device in the configuration accept 356.

Figure 4:
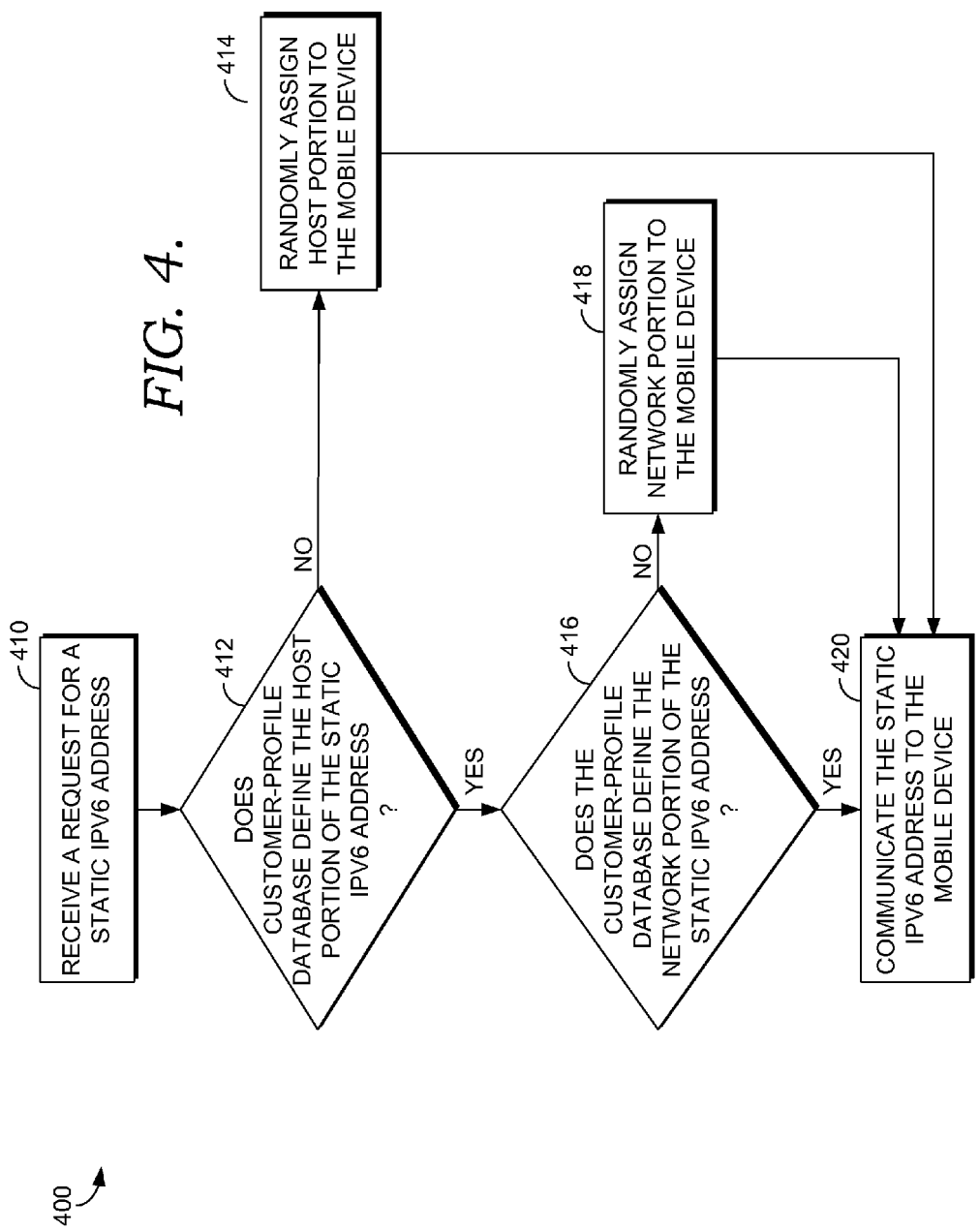
FIG. 4. depicts a flowchart of a method for assigning a static IPv6 address to a mobile device, in accordance with various embodiments of the present invention.

Turning now to FIG. 4, a flowchart is depicted of a method 400 for assigning a static IPv6 address to a mobile device, in accordance with various embodiments of the present invention. Initially, a network component, such as the MAG, may receive an indication that the mobile device has been authenticated on the communications network. Once authenticated, a request is received at step 410 for a static IPv6 address. At step 412, it is determined whether the customer-profile database defines the network portion of the static IPv6 address. As previously mentioned, a static IPv6 address comprises a network portion and a host portion that are each 64-bits, and when combined, creates a 128-bit IP address. If the customer-profile database does not define the network portion of the static IPv6 address, the network portion is randomly or otherwise assigned at step 414. The network portion is typically assigned by the LMA. If the customer-profile database does define or store the network portion associated with a particular mobile device, it can then be determined at step 416 whether the host portion of the static IPv6 address is defined in the customer-profile database. When the customer-profile database defines either the network portion or host portion of the static IPv6 address, this may signify that the defined portion has previously been used by the mobile device.

In one embodiment, determining whether the customer-profile database defines either the network portion or host portion of the static IPv6 address comprises communicating an attribute request to an authentication component that accesses the customer-profile database to determine that the customer-profile database defines the network and host portions of the IPv6 address associated with the mobile device. The attribute request may request the network portion of the IP address, the host portion of the IP address, a DNS server assignment, etc. In addition to these attributes, the attribute request may include a network access identifier (NAI) associated with the mobile device and the address or other identifier of the MAG so that the other network components know which mobile device is requesting its static IPv6 address and to which MAG the attributes are to be sent. In embodiments, there is more than one MAG in a single network, and thus identifying which MAG is requesting the attributes is helpful.

The attribute request is communicated, in one embodiment, from the MAG to the LMA such that the LMA directly requests the authentication component for the attributes. Further, an indication is received of the network portion and/or host portion of the static IPv6 address. This indication of the static IPv6 address may be sent in the form of a binding acknowledgment from the LMA.

Returning to FIG. 4, if the customer-profile database does not define the host portion of the static IPv6 address at step 416, the host portion is randomly assigned to the mobile device at step 418. This assignment of the host portion is typically done by the MAG. If the host portion is defined in the customer-profile database, the static IPv6 address, including the network and host portions, are received and are communicated to the mobile device at step 420. If one or more of the network portion or the host portion are randomly assigned at either step 414 or 418, those portions are communicated to the mobile device at step 420. Once the mobile device knows the network and host portions of the static IPv6 address, the mobile device is able to establish a communications session and communicate data, voice, and other media, for example, by way of a communications network. In one embodiment, the customer-profile database defines the static IPv6 address (e.g., host portion) for a particular mobile device when that static IPv6 address has previously been used by the mobile device. Because the address is static, the mobile device uses that same IPv6 address each time it attaches to the network.

Figure 5:
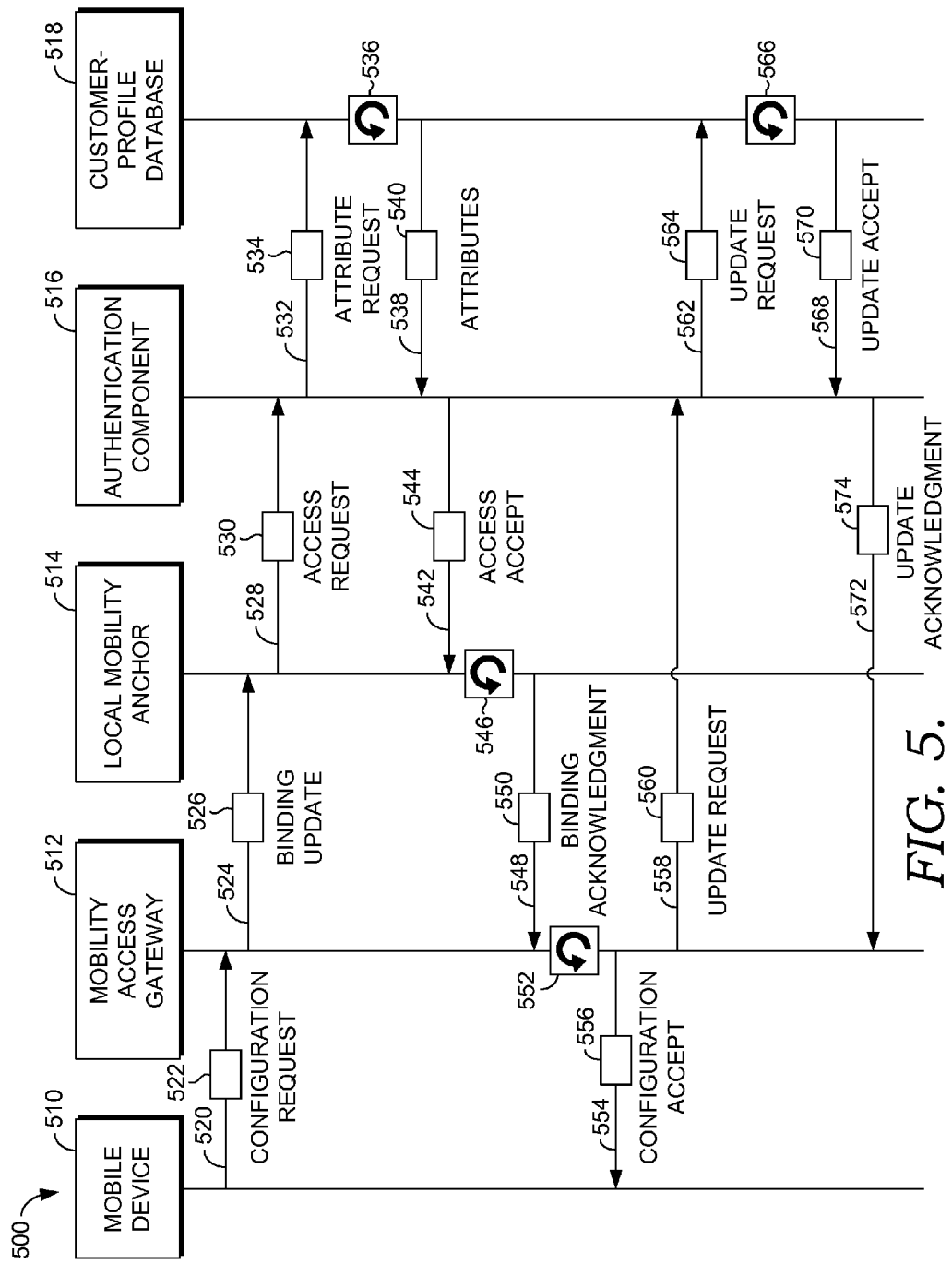
FIG. 5 depicts a flow diagram illustrating a method for negotiating a static IPV6 address with a mobile device, in accordance with an embodiment of the present invention.

FIG. 5 depicts a flow diagram illustrating a method 500 for negotiating a static IPV6 address with a mobile device, in accordance with an embodiment of the present invention. While assigning a static IPv6 address to a mobile device has been previously discussed herein, the embodiment of FIG. 5 relates to negotiating a static IPv6 address with a mobile device. In one embodiment, a mobile device may propose to the network a full 128-bit static IPv6 address that it would like to use, and the mobile device may not have ever used that IPv6 address before. In an alternate embodiment, the mobile device may communicate to the network a static IPv6 address that it has previously used, and is requesting that it be allowed to use that IPv6 address again. Various components are illustrated in FIG. 5, including a mobile device 510, a MAG 512, an LMA 514, an authentication component 516, and a customer-profile database 518.

Initially in FIG. 5, the mobile device 510 communicates 520 a configuration request 522 to the MAG 512. The configuration request 522, in one embodiment, includes the entire static IPv6 address that the mobile device 510 is requesting to use. In another embodiment, the configure request 522 includes only a portion of the static IPv6 address that it is requesting to use, such as the host portion. Here, the mobile device 510 and the MAG 512 configure the link-local address. The MAG 512 communicates 524 a binding update 526 to the LMA 514, which includes identifying information in relation to the mobile device 510 (e.g., NAI) and the MAG 512. The binding update 526 may also include an indication as to which portion of the static IPv6 address the mobile device 510 is requesting. The mobile device 510 may not need to verify the network portion of the static IPv6 address, as this portion may be assigned to a single entity, such as a large company, that uses IPv6 addresses having the same network portion. The LMA 514 communicates 528 an access request 530 to the authentication component 516, and indicates which attributes it is looking for. The authentication component 516 then communicates 532 an attribute request 534 to the customer-profile database requesting that the customer-profile database perform a lookup to determine whether it has stored certain attributes associated with the mobile device.

At step 536, the customer-profile database 518 performs a lookup to determine which attributes it defines for the mobile device. The customer-profile database communicates 538 attributes 540 to the authentication component 516, which communicates 542 an access accept 544 to the LMA. The access accept 544 indicates to the LMA which attributes are not stored in the customer-profile database 518. In one instance, the customer-profile database does not have a stored value for the network portion of the static IPv6 address, and as such, the LMA 514 assigns the network portion at step 546. A binding acknowledgment 550 is communicated 548 to the MAG 512 from the LMA 514. In one embodiment, the customer-profile database does not have a stored value for the host portion of the static IPv6 address, and as a result, the MAG 512 assigns the host portion at step 552.

In the case where the customer-profile database 518 does not have a stored value for the host portion of the static IPv6 address that the mobile device 510 has proposed, it is determined whether that host portion is already being used by another device. This is also performed at step 552. In one instance, this process is Duplicate Address Detection (DAD). Devices attached to the same MAG 512 and that have the same network portion of their static IPv6 address as the mobile device 510 are sent a message that assists in determining if any of those other devices are currently using the same network portion that the mobile device 510 has requested. This process may be performed any time the host portion is not defined for a particular mobile device in the customer-profile database 518.

The MAG 512 communicates 554 a configuration accept 556, which is a response to the configure request 522. The configuration accept 556 indicates to the mobile device whether or not the proposed static IPv6 address can be used. If the result of the duplication test is that the host portion is already in use by another device, the mobile device 510 may propose another host portion to use. The process, starting with the configure request 522, would start over. If the host portion is not in use, an update request 560 is communicated 558 to the authentication component 516, which requests that the subscriber's profile be updated with the host portion of the static IPv6 address such that next time the mobile device 510 requests to use that host portion, various processes, such as the duplication test, will not be required and the host portion will be associated with the mobile device 510. In one embodiment, the update request 560 is an access request that includes an indication of the host portion of the static IPv6 address. The authentication component 516 communicates 562 the update request 564 to the customer-profile database 518 to update the subscriber's profile. In the embodiment mentioned above, the update request 564 may be an access request.

The customer-profile database 518 updates the subscriber's profile at step 566, and communicates 568 an update accept 570 to the authentication component 516. In one embodiment, the update accept 570 is an access accept acknowledging that the subscriber's profile has been updated. The update accept 570 acknowledges that the subscriber's profile was updated. The authentication component communicates 572 an update acknowledgment 574 to the MAG 512, which is a reply to the update request 560. In one embodiment, the update acknowledgment 574 is an access accept confirming that the subscriber's profile has been updated with the host portion of the static IPv6 address that the mobile device 510 will use to establish an IPv6 communications session. It should be noted that if the host portion is defined in the customer-profile database 518, the duplication test may not be performed, and the subscriber's profile does not need to be updated, as the host portion is already stored in the customer-profile database 518.

Figure 6:
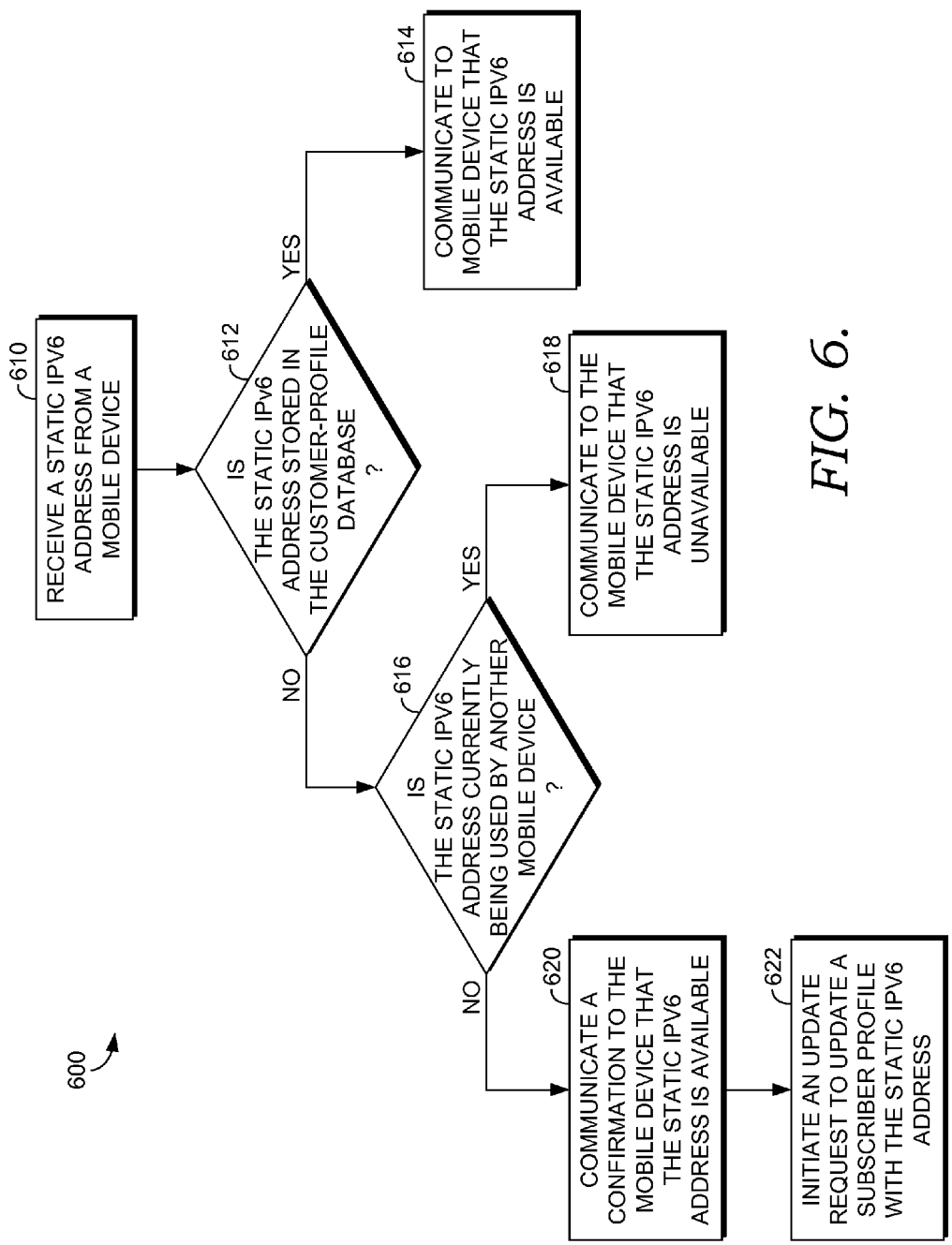
FIG. 6 depicts a flowchart of a method for negotiating a static IPv6 address with a mobile device, in accordance with an embodiment of the present invention.

Referring to FIG. 6, a flowchart is illustrated of a method 600 for negotiating a static IPv6 address with a mobile device, in accordance with an embodiment of the present invention. Initially, a static IPv6 address is received from a mobile device 610. This address may be one that the mobile device has used before, or may be one that the mobile device has not used before. For instance, the static IP address may be an address that is proposed by the mobile device based on a common network portion of the static IPv6 address that all devices associated with a certain company use. While the mobile device may send the entire static IPv6 address, such as both the network and host portions, in one embodiment, the mobile device sends only the host portion in its request to the MAG. Generally, a static IPv6 address comprises a network portion that is 64-bits and a host portion that is also 64-bits. Combined, a 128-bit address is provided.

At step 612, it is determined whether the static IP address is stored in the customer-profile database. Again, although referred to as the static IP address, in actuality, only a portion of the static IPv6 address (e.g., host portion) may be sent from the mobile device, and as such, it may only be determined whether a portion of the static IPv6 address is stored in the customer-profile database. Making this determination at step 612 may comprise communicating a binding update to a LMA that communicates an access request to an authentication server. The authentication server communicates an attribute request to the customer-profile database for retrieval of various attributes, such as the network portion, the host portion, etc. If the static IP address or a portion thereof is stored in the customer-profile database, an acknowledgment is sent to the mobile device indicating that the mobile device is free to use that address because the address is available. This is shown at step 614. If, however, the static IP address is not stored in the customer-profile database, it is determined at step 616 whether the static IPv6 address is currently being used by another mobile device. For instance, a duplication test (e.g., DAD) may be performed, which entails sending duplication requests out to each device currently attached to the same MAG as the mobile device and whose network portions are identical to the mobile device's network portion. From this, it can be determined whether the static IPv6 address is available for use by the mobile device by determining if any of the other devices are using the host portion that the mobile device has proposed.

If the static IPv6 address is being used by another device, a message is sent to the mobile device indicating that the address is unavailable, shown at step 618. Here, the mobile device may be prompted to send an alternate static IPv6 address that it would like to use. If the static IPv6 address is not currently being used, a confirmation or acknowledgment is communicated to the mobile device at step 620 indicating that the static IPv6 address is available. This allows the mobile device to establish an IPv6 communications session using the static IPv6 address. Further, at step 622, an update request is initiated and communicated and directs the customer-profile database to update the subscriber profile with the static IPv6 address such that next time the mobile device is attempting to establish a communications session, the static IPv6 address will be stored and the duplication test will not have to be performed again.

In one embodiment, when a mobile device requests use of a certain static IPv6 address and the address is not found in the customer-profile database, it may be determined whether another static IPv6 address is stored in association with that particular mobile device. In this case, if another static IPv6 address is stored, a message may be sent to the mobile device suggesting that the mobile device use the stored address instead of the proposed address.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method for negotiating Internet Protocol version six (IPv6) addresses with mobile devices, the method comprising:

receiving a static IPv6 address from a mobile device indicating that the mobile device is requesting to use the static IPv6 address for an IPv6 communications session, wherein the mobile device has previously used the static IPv6 address to establish a different IPv6 communications session;

determining that the static IPv6 address received from the mobile device is stored in a customer-profile database in association with the mobile device; and allowing the mobile device to establish the IPv6 communications session using the static IPv6 address received from the mobile device.

2. The computer-readable media of claim 1, wherein the static IPv6 address is a 128-bit IPv6 address that comprises a host portion and a network portion.

3. The computer-readable media of claim 1, wherein allowing the mobile device to establish the IPv6 communications session further comprises communicating an acknowledgment response to the mobile device, wherein the acknowledgement response includes an indication of the static IPv6 address.

4. The computer-readable media of claim 2, wherein determining that the static IPv6 address is stored in the customer-profile database further comprises communicating a binding update to a local mobility anchor that communicates an access request to an authentication server that communicates an attribute request to the customer-profile database for retrieval of various attributes, wherein the various attributes include one or more of the host portion or the network portion of the static IPv6 address.

5. The computer-readable media of claim 1, wherein the static IPv6 address received from the mobile device includes only the network portion of the static IPv6 address.

6. Non-transitory computer-readable media having computer-executable instructions embodied thereon that, when executed, facilitate a method for negotiating Internet Protocol version six (IPv6) addresses with mobile devices, the method comprising:

receiving a request from a mobile device to establish an IPv6 communications session, wherein the request comprises at least a portion of a static IPv6 address thus indicating that the mobile device has previously used at least the portion of the static IPv6 address to establish a different IPv6 communications session;

accessing a customer-profile database to determine that the static IPv6 address received from the mobile device is not stored in the customer-profile database in association with the mobile device;

determining whether the static IPv6 address received from the mobile device is currently available;

if the static IPv6 address is currently unavailable, communicating an indication to the mobile device that the static IPv6 address is unavailable; and if the static IPv6 address is currently available,
(a) communicating an acknowledgment to the mobile device indicating that the static IPv6 address is available, and
(b) storing the static IPv6 address in the customer-profile database in association with the mobile device.

7. The computer-readable media of claim 6, wherein the static IPv6 address is a 128-bit IPv6 address that comprises a host portion and a network portion.

8. The computer-readable media of claim 6, wherein the static IPv6 address is available if it is currently not being used in association with another mobile device.

9. The computer-readable media of claim 6, wherein if the static IPv6 address is currently unavailable, further comprising requesting that the mobile device communicate an alternate static IPv6 address.

10. The computer-readable media of claim 6, wherein the at least the portion of the static IPv6 address received from the mobile device is a network portion of the static IPv6 address.

11. The computer-readable media of claim 6, wherein if the static IPv6 address is currently available, further comprising communicating an update request to an authentication component to update a subscriber profile associated with the mobile device to store the static IPv6 address in association with the mobile device.

12. The computer-readable media of claim 11, further comprising receiving an update acknowledgment from the authentication component confirming that the subscriber profile has been updated with the static IPv6 address.

13. The computer-readable media of claim 6, wherein determining whether the static IPv6 address is currently available further comprises performing a duplicate address detection on the static IPv6 address.

14. The computer-readable media of claim 13, wherein the duplicate address detection comprises sending out duplication requests to other mobile devices currently attached to a mobility access gateway associated with the mobile device.

15. The computer-readable media of claim 14, wherein a host portion of the static IPv6 address and the host portion of other static IPv6 addresses assigned to the other mobile devices to which the duplication requests are sent are identical.

16. Non-transitory computer-readable media having computer-executable instructions embodied thereon that, when executed, facilitate a method for negotiating Internet Protocol version six (IPv6) addresses with mobile devices, the method comprising:

receiving a request from a mobile device to establish an IPv6 communications session, wherein the request includes a host portion and a network portion of a static IPv6 address that the mobile device is proposing to use for the IPv6 communications session thus indicating that the mobile device has previously used the host portion and the network portion of the static IPv6 address to establish a different IPv6 communications session;

determining that the static IPv6 address is not stored in a customer-profile database in association with the mobile device;

inspecting other static IPv6 addresses currently being used to determine that the static IPv6 address is available;

communicating a confirmation to the mobile device that the static IPv6 address is available; and initiating an update request to update a subscriber profile associated with the mobile device in the customer-profile database to indicate that the static IPv6 address is associated with the mobile device.

17. The computer-readable media of claim 16, wherein the static IPv6 address is available if it is not currently being used by another mobile device.

18. The computer-readable media of claim 16, wherein the host portion of the other static IPv6 addresses and the host portion of the static IPv6 address received from the mobile device are identical.

19. The computer-readable media of claim 16, further comprising:

communicating the update request to a local mobility anchor that forwards the update request to an authentication component that accesses the customer-profile database to update the subscriber profile; and receiving an update acknowledgment indicating that the subscriber profile has been updated with the static IPv6 address.

20. The computer-readable media of claim 16, wherein inspecting the other static IPv6 addresses further comprises communicating duplication requests to each of a plurality of mobile devices whose IPv6 addresses have host portions identical to the host portion of the static IPv6 address associated with the mobile device to determine if the network portion of the static IPv6 address is available.

\* \* \* \* \*